Jan. 4, 1944.   D. J. DOLAN   2,338,693
CLUTCH AND TRANSMISSION
Filed Jan. 10, 1940   5 Sheets-Sheet 1
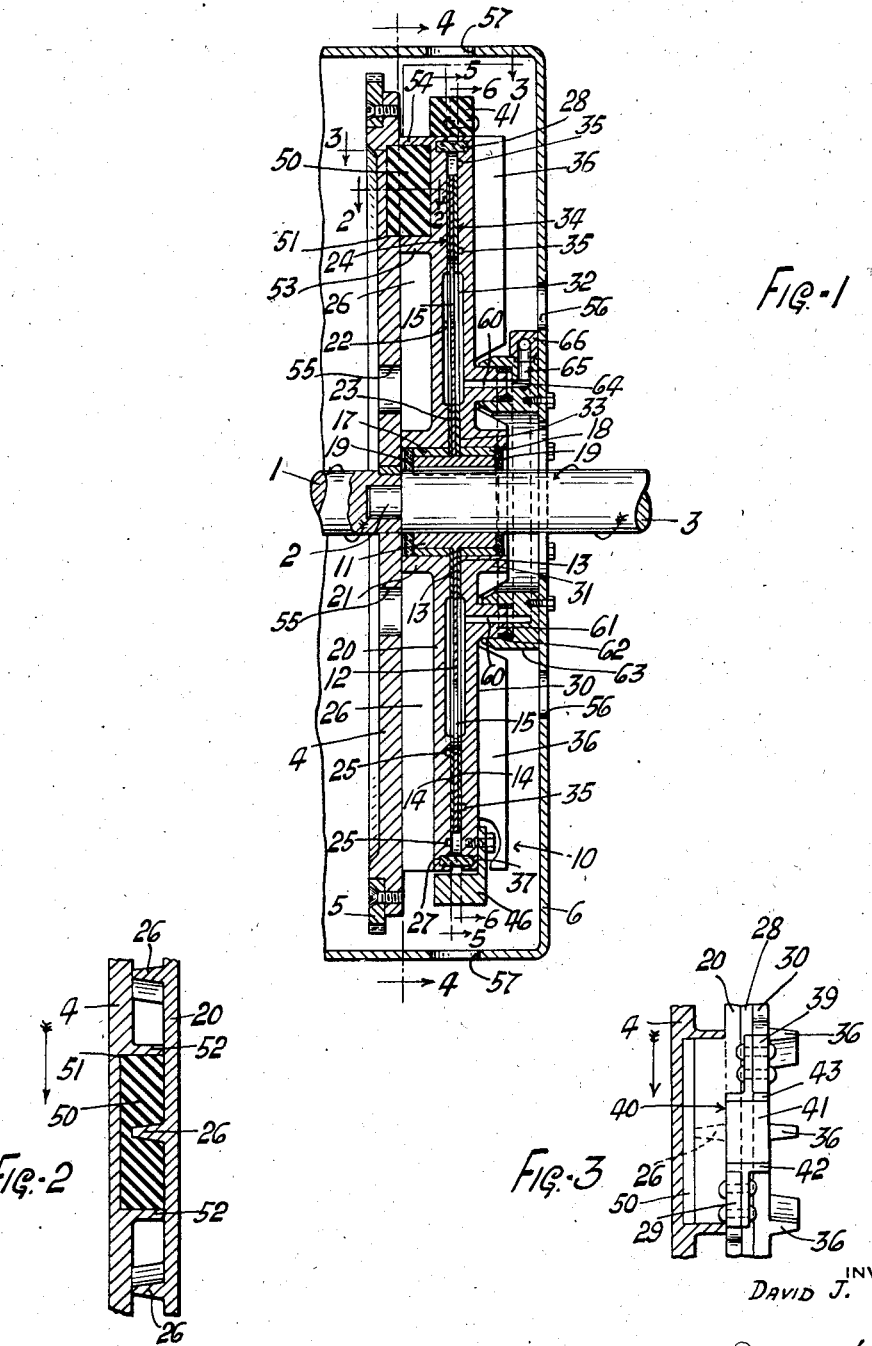
INVENTOR
DAVID J. DOLAN
BY
Ely & Frye
ATTORNEYS Jan. 4, 1944.                    D. J. DOLAN                    2,338,693
                           CLUTCH AND TRANSMISSION
                            Filed Jan. 10, 1940          5 Sheets-Sheet 2
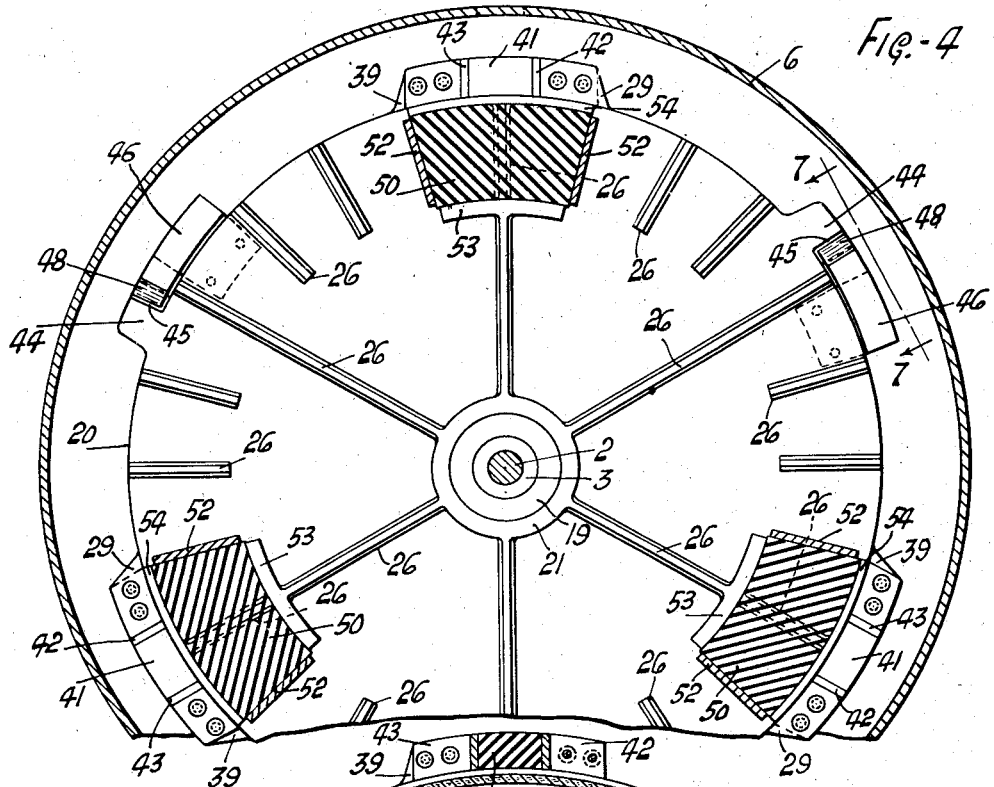
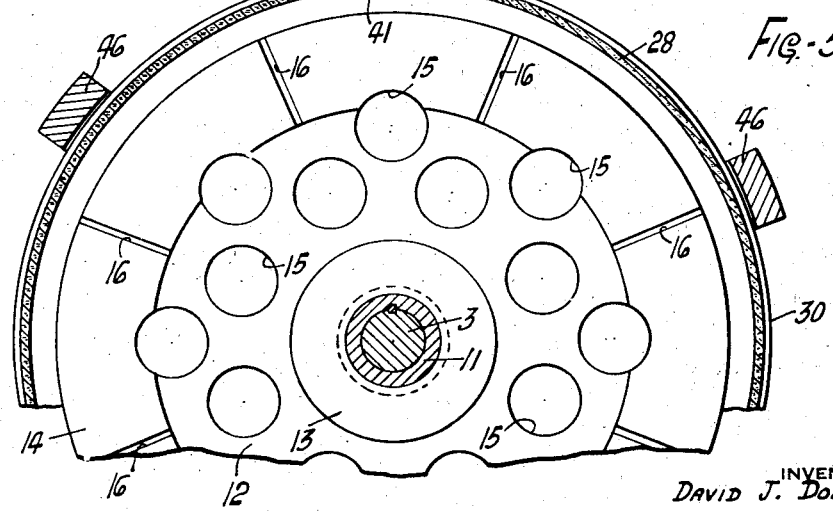
INVENTOR
DAVID J. DOLAN
BY
ATTORNEYS Jan. 4, 1944.  D. J. DOLAN  2,338,693
CLUTCH AND TRANSMISSION
Filed Jan. 10, 1940   5 Sheets-Sheet 3
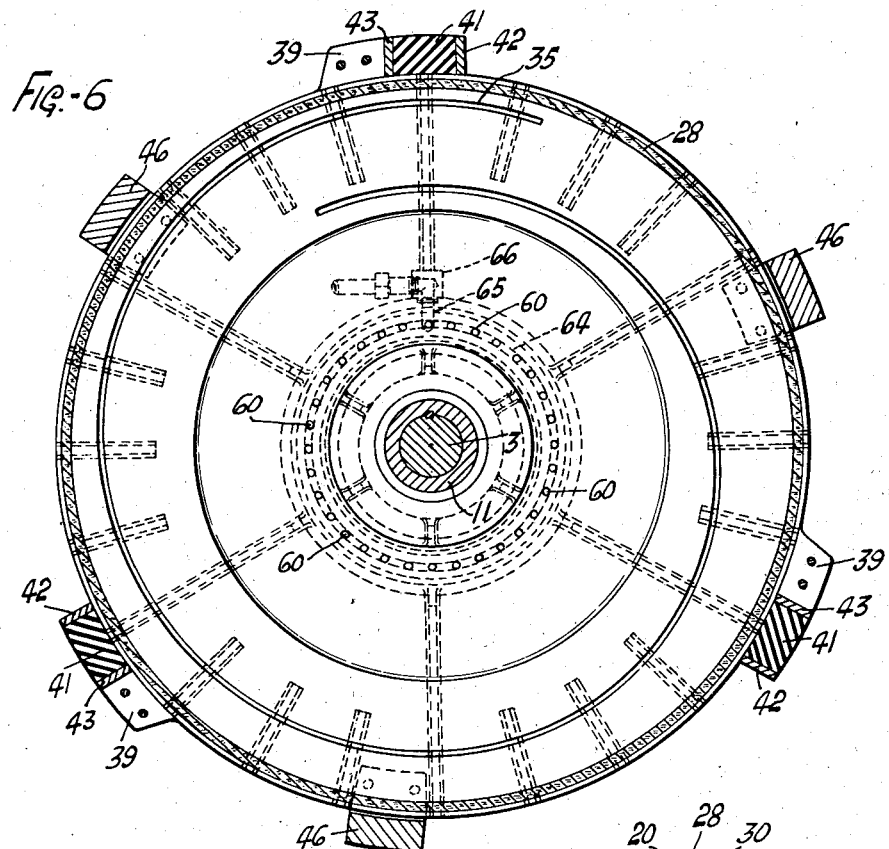
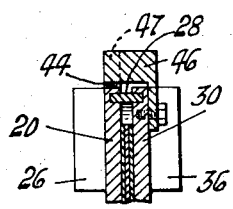
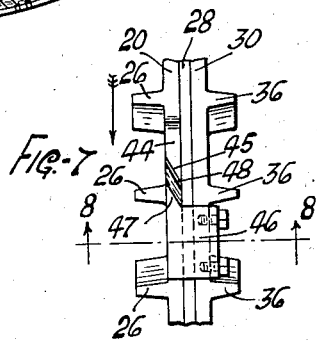
INVENTOR
DAVID J. DOLAN
BY
Ely & Frye
ATTORNEYS Jan. 4, 1944.      D. J. DOLAN      2,338,693
CLUTCH AND TRANSMISSION
Filed Jan. 10, 1940      5 Sheets-Sheet 4
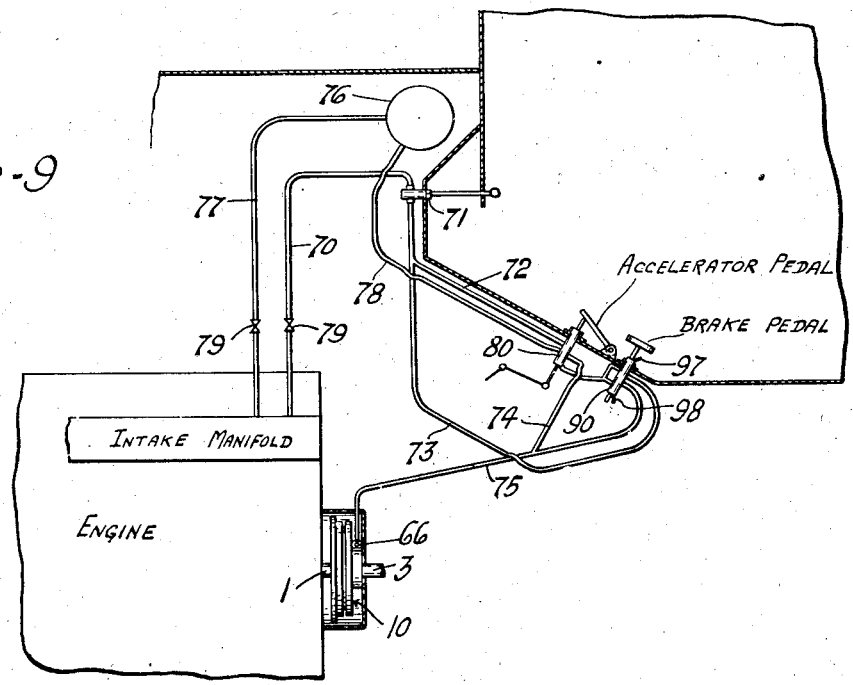
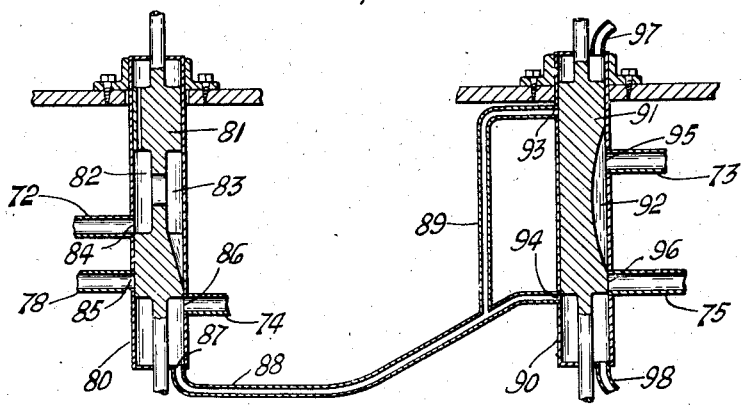
INVENTOR
DAVID J. DOLAN
BY
Ely & Frye
ATTORNEYS Jan. 4, 1944.　　　　D. J. DOLAN　　　　2,338,693
CLUTCH AND TRANSMISSION
Filed Jan. 10, 1940　　　5 Sheets-Sheet 5

INVENTOR
DAVID J. DOLAN
BY Ely & Frye
ATTORNEYS

Patented Jan. 4, 1944

2,338,693

UNITED STATES PATENT OFFICE 2,338,693

CLUTCH AND TRANSMISSION

David J. Dolan, Cleveland Heights, Ohio; Corinne C. Dolan administratrix of said David J. Dolan, deceased Application January 10, 1940, Serial No. 313,262

27 Claims. (Cl. 192—.01)

This invention relates to a clutch and transmission and, more particularly, to a fully automatic clutch which is actuated directly by differential fluid pressures and to a geared transmission which is automatically selective in response to load demands.

In the prior art automatic clutches for automobiles and the like have generally employed either powered actuating mechanisms to engage or disengage a conventional friction clutch or have employed a liquid as the connection between the driving and driven members of the clutch. In automatic geared transmission, the several stages of speed reduction are usually accomplished by employing powered actuating mechanisms which engage or disengage the gearing in the several steps of speed reduction.

It is an object of this invention to provide a fully automatic clutch which eliminates the need for powered actuating mechanism for engaging or disengaging the clutch and which does not require a liquid connection between the driving and driven members. This object is accomplished by employing the manifold vacuum of an internal combustion engine to evacuate the space included between the driving and driven members of the clutch whereby the ambient atmospheric pressure forces the driving and driven members into a secure frictional engagement. Another object of this invention is to provide a friction clutch which is smooth acting but which does not require the use of friction material between the driving and driven members.

A further object of this invention is to provide a geared transmission which is fully automatic and which passes from one stage of speed reduction to an adjacent stage of speed reduction smoothly and without passing through a neutral and without the use of powered actuating mechanisms for changing the drive from one ratio to another ratio.

A still further object of this invention is to provide a control system for a clutch and transmission responsive to the actuation of the throttle and brake of an automobile which will regulate the operation of the clutch and transmission.

An advantage of a clutch and transmission made according to this invention is that it is simple and positive in action and may be manufactured at substantially no more cost than conventional manually operated clutches and transmissions. Other and further objects and advantages will appear from the following specification, claims, and drawings in which:

Fig. 1 is a section taken along the axis of a clutch made according to this invention;

Fig. 2 is a detailed fragmentary section taken along the line 2—2 of Fig. 1;

Fig. 3 is a detailed fragmentary plan view taken from the line 3—3 of Fig. 1 showing a lead lug;

Fig. 4 is a section taken along the line 4—4 of Fig. 1;

Fig. 5 is a section taken along line 5—5 of Fig. 1;

Fig. 6 is a section taken along line 6—6 of Fig. 1;

Fig. 7 is a detailed fragmentary plan view taken from the line 7—7 of Fig. 4;

Fig 8 is a detailed fragmentary section taken along the line 8—8 of Fig. 7;

Fig. 9 is a diagrammatic view illustrating the clutch control system;

Fig. 10 is a detailed diagrammatic sectional view illustrating the control valves;

Figure 11:
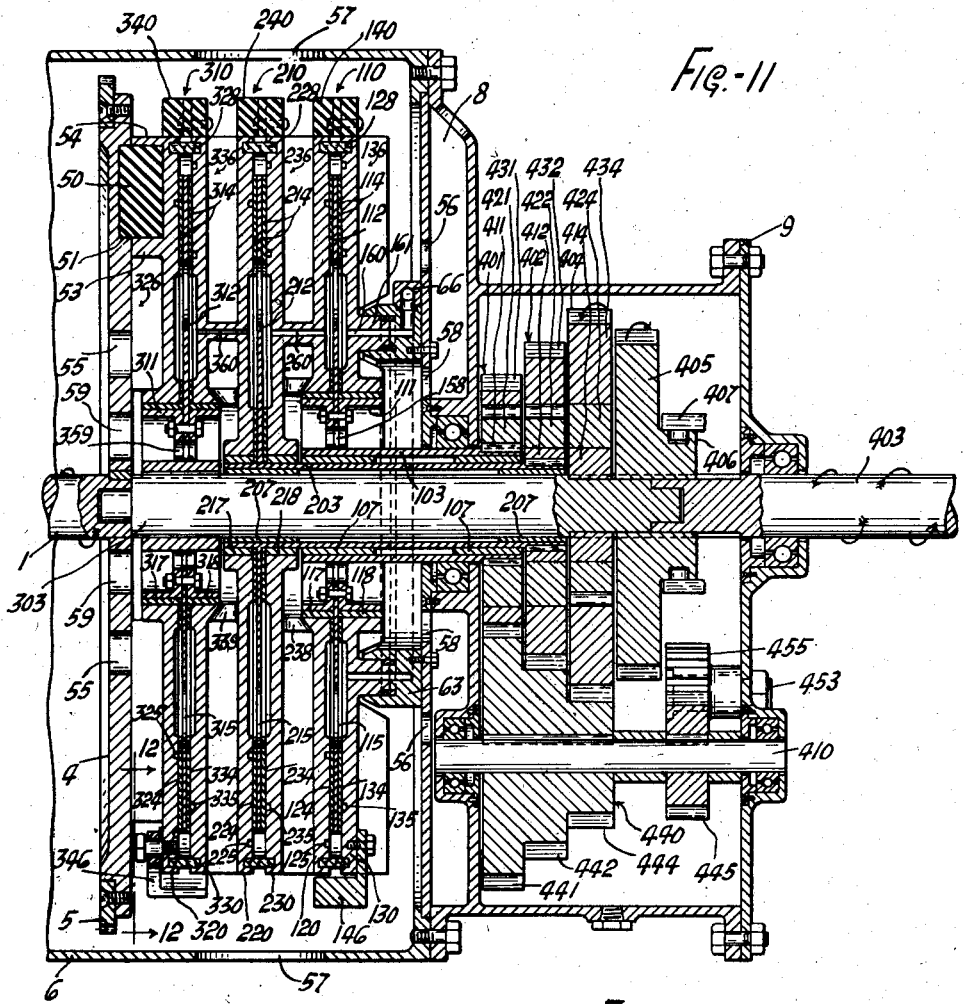
Fig. 11 is a section taken along the axis of a transmission made according to this invention.

In the drawings, in which like reference characters refer to like parts, the construction of a clutch made according to this invention is illustrated in Figs. 1 to 8. A driving shaft 1, which is normally the crank shaft in an internal combustion automobile motor, is provided with a socket to receive the pilot 2 of an aligned driven shaft 3, which, in the embodiment shown in Figs. 1 to 10, may be connected to a conventional automobile transmsision. A flywheel 4, preferably of stamped sheet steel construction in order to reduce weight, is keyed to the end of the driving shaft 1 and carries a starter ring gear 5 suitably secured to the fly-wheel rim.

The fly-wheel 4 and the improved clutch 10 are enclosed within a housing 6 which is usually fixed to the automobile motor block, the clutch 10 being carried by the driven shaft 3. A clutch plate hub 11 is keyed to the end of the driven shaft 3, thereby securing the clutch plate 12, which is integral with the hub 11, to the shaft 3.

The clutch plate 12, as shown in Figs. 1 and 5, is preferably a steel disc on both sides of which integral inner sealing rings 13 and outer friction rings 14 are carried. The sealing rings 13 and and friction rings 14 are preferably of graphite bronze or a similar bearing metal welded to the steel clutch plate 12. In order to prevent the clutch plate 12 from "dishing" or warping under load, a plurality of openings 15 in the central portion of the plate 12 and radial slots 16 extending across the friction rings 14 are provided. The openings 15 and slots 16 also permit the passage of air through the plate and prevent air from being trapped on substantially any portion of the surfaces of the plate 12. As shown in Fig. 5, the several openings 15 and slots 16 are so arranged that portions of their orbits coincide so that air picked up, for example, in the slots 16 may pass to the openings 15.

The clutch plate hub 11 carries a bushing 17 on which is rotatably mounted the flanged hub 21 of the face plate 20. The clutch plate hub 11 also carries a bushing 18 on which is rotatably mounted the flanged hub 31 of the face plate 30. The annular spaces between the hubs 21 and 31 and the shaft 3 are sealed by the packing washers 19 which prevent the leakage of air into the space included between the face plates 20 and 30.

The inner surface of the face plate 20 is provided with an annular shallow channel 22 between the inner annular bearing surface 23 and an outer annular friction surface 24. The bearing surface 23 and the friction surface 24 substantially correspond in respect to area and location to the adjacent bearing ring 13 and friction ring 14 of the clutch plate 12. While the clutch is disengaged, enough clearance is provided between the ring 14 and surface 24 to provide a good running fit, i. e., the clearance is preferably at least four-thousandths of an inch. A spiral groove 25 is cut in the friction surface 24 in order to prevent air from being trapped thereon. The outer surface of the face plate 20 is provided with a plurality of fins 26 which stiffen the plate and aid in the dissipation of heat generated during actuation of the clutch.

The face plate 30 is substantially similar to face plate 20, being provided on its inner surface with a shallow channel 32, an annular bearing surface 33, and a friction surface 34 which has a spiral groove 35 in the face thereof. The clearance between the friction surface 34 and the adjacent friction ring 14 while the clutch is disengaged is also sufficient to provide a good running fit. The outer surface of the face plate 30 is provided with a plurality of stiffening and heat dissipating fins 36.

An annular sealing groove 27 is cut in the friction surface 24 of the plate 20 adjacent the periphery thereof, and a similar groove 37 is cut in the plate 30. A packing ring 28, preferably of cork composition or the like, is fitted in the grooves 27 and 37, thereby sealing off the space included between the inner surfaces of the face plates 20 and 30.

Relative movement of the plate 20 with respect to the plate 30 is restrained by the several resilient load dogs 40 located on the rims of the plates 20 and 30. Preferably, as shown in Fig. 3, each dog 40 comprises a block of rubber 41, to the ends of which are bonded or otherwise secured the brackets 42 and 43. The bracket 42 is riveted or otherwise secured to a lug 29 which is integral with the rim of the plate 20 and the bracket 43 is similarly secured to a lug 39 on the plate 30. The dogs 40 serve as resilient connections preventing unlimited axial movement of the plates 20 and 30 with respect to each other when the clutch is disengaged, but their primary function is to absorb shock loads while the clutch is engaged or is being engaged since the plate 20 tends to lead the plate 30 in the direction of rotation when the clutch is under load.

A positive limit to the lead in the direction of rotation of the plate 20 with respect to the plate 30 is provided by the several pairs of wedging lugs 44 and 46, which are also located about the rims of plates 20 and 30. In each pair of wedging lugs, the lug 44 is integral with the plate 20 and is provided with a wedge face 45; the lug 46 comprises an angle secured to the plate 30, one arm of the angle overlying the rims of the plates and being provided with a wedge ear 47 corresponding to the wedge face 45. In order to absorb the shock of the engagement of the lugs 44 and 46, a rubber wedge face 48 may be bonded to the wedge ear 47. The amount of clearance between the wedge lugs 44 and 46 limits the amount of rotary movement in the direction of rotation of the plate 20 relative to the plate 30. As shown in Fig. 7, which illustrates the lugs 44 and 46 under no load, the lug 44 is located behind, in the direction of rotation, the lug 46. When the load on the clutch is so great that the tendency of the plate 20 to lead the plate 30 overcomes the resistance of the dogs 40, the engagement of the lugs 44 and 46 not only prevents further relative rotary movement of the plate 20, but the wedging action of the lugs tends to force the plates 20 and 30 together, thereby assuring the engagement of the clutch plate 12 by the face plates 20 and 30 when there is a large torque load on the clutch.

The torque of the driving shaft 1 is transmitted through the fly-wheel 4 to the face plate 20 through the several resilient key blocks 50 which are fitted in sockets 51 in the fly-wheel 4 and are supported laterally by fins 52 which are integral with the fly-wheel. The key blocks 50 are preferably of rubber and each key block is provided with a radial groove which receives a fin 26 of the face plate 20. The key blocks 50 are prevented from being dislodged radially by the short arcuate fins 53 and 54 on the face plate 20.

In order to ventilate the clutch housing 6 and to dissipate heat generated by actuation of the clutch, inlets 55 are provided in the fly-wheel 4 to admit air adjacent the hub of the face plate 20, and inlets 56 are provided in the housing 6 to admit air adjacent the hub of the face plate 30. As the clutch is driven, the fins 26 and 36 blow the admitted air through the outlets 57 in the outer wall of the clutch housing 6.

The clutch 10, which is normally disengaged, is engaged by evacuating the air from the sealed space included between the clutch plates 20 and 30 so that the atmosphere on the outer surfaces of the face plates 20 and 30 force them into engagement with the clutch plate 12. In order to evacuate the clutch 10, the face plate 30 is provided with a plurality of ports 60 which extend through the integral port ring 61 of the plate 30. The port ring 61, which is provided with suitable packing, is rotatably received in the annular commutator groove 62 of the fixed collector ring 63. The commutator groove is provided with a collector groove 64 into which the ports 60 open, the collector groove 64 being connected by the passage 65 to the collector ring nipple 66, which may be connected by suitable tubing to an internal combustion engine manifold, the normal source of vacuum supply.

Clutch operation

The operation of the clutch disclosed in Figs. 1 to 8 is as follows: Torque from the driving shaft 1 is transmitted by the fly-wheel 4 affixed thereto through the resilient rubber key blocks 50 to the face plate 20, which, when the clutch 10 is disengaged, is freely rotatable on the bushing 17. The face plate 30 is also freely rotatable on its bushing 18, and, because of resilient connection offered by the load dogs 40, tends to rotate as a unit with the face plate 20.

With the vacuum supply line connected to the nipple 66 open to the atmosphere, air is supplied to all portions of the space included between the plates 20 and 30 through the passage 65, collector groove 64, and ports 60, whence it is distributed by the openings 15 and slits 16 in the clutch plate 12 and by the spiral grooves 25 and 35, respectively of the face plates 20 and 30. Although the clearance between the face plates 20 and 30 and the clutch plate 12 is preferably slight, i. e., approximately .005 inches, the clutch 10 runs free when thus disengaged, the only drag of the face plates 20 and 30 on the clutch plate 12 being the negligible drag caused by the viscosity of the air entrained by the friction surfaces 24 and 34 and the friction of the bearing rings 23 and 33, bushings 17 and 18, and pilot 2.

Since the space included between the face plates 20 and 30 is sealed by the washers 19 and the packing ring 28, when air is evacuated from the interior of the clutch by connecting the nipple 66 to a source of vacuum, the atmospheric pressure on the outer surfaces of the face plates forces them to move axially toward each other, thereby engaging the friction surfaces 24 and 34 with the friction rings 14, thereby transmitting the torque of the driving shaft 1 through the clutch plate 12 and hub 11 to the driven shaft 3. Of course, when the line to the nipple 66 is reopened to atmosphere pressure, the differential pressure on the face plates drops to zero almost immediately and the resilient load dogs 40 return the face plates to their normal disengaged positions. Because the face plates 20 and 30 are light and the distances which they have to move from their engaged to disengaged positions are almost undiscernible, the clutch is acutely responsive.

It is apparent from the foregoing that the amount of torque which can be transmitted by the clutch disclosed is directly proportional to the differential between the atmospheric pressure on the outer surface of the face plates and vacuum within the interior of the clutch. If, in the clutch disclosed, the diameter of the clutch is 11.5 inches, each face plate thereby having an area of approximately 100 square inches, the total pressure on the friction rings 14 is one thousand pounds, when the automobile engine is operating under a normal load and speed with a manifold pressure differential of five pounds per square inch. Allowing for a static coefficient of friction of .95 between the friction rings 14 and friction surfaces 24 and 34 and an effective radius of 5.5 inches for the friction rings 14, the torque which the clutch 10 can transmit without slippage will be approximately 435 foot-pounds, which is more than ample for any load which can be taken by the automobile engine. However, if the automobile engine is heavily loaded, the intake manifold pressure differential may drop to .5 pound per square inch, in which case the total pressure on the friction rings will be only 100 pounds per square inch and the torque which the clutch can transmit without slippage will be not more than 43.5 foot-pounds, so that the clutch 10, therefore, may begin to slip under a heavy load.

If the clutch 10 does begin to slip, the drag of the friction ring 14 on the friction surface 34 will cause the face plate 30 to lag behind the face plate 20 until the wedge lug 44 engages the wedge lug 46, thereby causing the face plates to be forced together mechanically into engagement with the clutch plate 12. Since the wedge lugs 44 and 46 may afford a mechanical advantage of ten, under the aforesaid heavy load conditions in which the total pressure of the plates 20 and 30 may be only one hundred pounds, the action of the wedge lugs will increase the pressure of the plates to one thousand pounds, which, as pointed out above, will be ample for any load conditions. Therefore, if the pressure differential on the face plates 20 and 30 is insufficient to drive the clutch plate 12, the wedge lugs 44 and 46 will insure a positive drive.

It is also apparent from the foregoing that the rate of engagement of the clutch is directly proportional to the rate at which the differential pressure on the face plates is created, and since the rate of increase in the differential pressure may be controlled readily by metering the vacuum supplied to the nipple 66, the responsiveness of the clutch may be regulated. The clutch operates smoothly even though the engaging surfaces of the clutch are metal, which, in this clutch, has been found to be superior to the non-metallic linings usually employed and which, of course may be employed in the clutch disclosed. The smoothness of operation of the clutch and the absence of grabbing or seizing and scoring of the metallic plates may be attributed to several factors, the relative importance of which has not been determined, namely, the resilience of the connecting members, i. e. the key blocks 50, load dogs 40, and the wedge faces 48, the controlled responsiveness of the clutch, the cooling of the face plates 20 and 30 by the considerable volume of air drawn by the fins 26 and 36 through the inlets 55 and 56 and expelled through the outlets 57, and the lubricating effect of the air within the clutch which is entrained by the friction surfaces 24 and 34. Because the clearances between the friction surfaces 24 and 34 and the friction rings 14 are slight, it is believed that the air distributed over the friction surfaces by the spiral grooves 25 and 35 and the slits 16 behaves as any low viscosity fluid and actually lubricates the friction surfaces. As air is gradually evacuated from within the clutch, the lubricating action of the entrained air gradually decreases, thereby accounting for the smooth engagement of the clutch.

Control system

The system of tube lines for controlling the clutch 10 when used in an automobile is shown diagrammatically in Figs. 9 and 10. The direct manifold line 70 leads from the intake manifold of the engine to a manually adjustable metering valve 71 from which one branch line 72 leads to the accelerator valve 80 and another branch line 73 leads to the brake valve 90. The accelerator valve 80 is connected to the nipple 66 of the clutch 10 by the branch 74 of the clutch supply line 75 which connects the brake valve 90 to the nipple 66. An auxiliary vacuum storage tank 76 is connected to the manifold by the line 77 and to the accelerator valve 80 by the line 78. Suitable auxiliary tank check valves 79 are placed in the lines 70 and 77 above the manifold.

The accelerator valve 80 is preferably a piston valve in which the piston 81, movable in direct response to the accelerator pedal of the automobile, is provided with interconnected valve passages 82 and 83, the end of the valve passage 83 extending almost to the end of the piston 81 and being made conical so as to serve as a metering valve passage. In one side of the valve 80 are located a port 84 which is connected to the manifold branch line 72 and a port 85 which is connected to the auxiliary tank line 78, the port 85 being located below the port 84 a distance somewhat less than the travel of the piston 81 and capable of being connected to the port 84 by the valve passage 82. On the other side of the valve 80, in line with the passage 83, and located just below the bottom of the piston 81 when the piston is in its uppermost or normal position, is the port 86 which is connected to branch 74 of the clutch supply line 75. In the bottom of the valve 80 is located to the vent port 87 which is connected to the brake valve 90 by the vent line 88 and its branch 89.

The brake valve 90 is also a piston valve in which the piston 91 is provided with a valve passage 92. In one side of the valve 90 a vent port 93 is located a distance equal to about one-fourth of the piston travel below the top of the piston 91 when it is in its uppermost or normal position, and another vent port 94 is located just below the bottom of the piston 91 when it is in its normal position. The port 93 is connected to the branch vent line 89 and the port 94 is connected to the vent line 88. On another side of the valve and alined with the passage 92 are ports 95 and 96. When the piston 91 is in its normal position, the port 95 is located below the top of the passage 92 a distance equal to about one-fourth of the piston travel and the port 96 is located just below the bottom of the passage 92. The port 95 is connected to the manifold branch line 73 and the port 96 is connected to the clutch supply line 75. The portion of the valve 90 above the piston 91 is open to the atmosphere through the vent 97 and the portion below the piston 91 is open to the atmosphere through the vent 98.

*Control system operation*

The operation of the foregoing control system is as follows: While the engine is being started or while it is idling, the operator's foot is off the accelerator pedal, which operates the valve 80 and the brake pedal, which operates the valve 90. Under such conditions both valve pistons 81 and 91 are in the position shown in Fig. 10 and the clutch 10 is disengaged, since the clutch supply line 75 is open to atmospheric pressure through the branch 74, port 86, port 87, vent line 88, port 94, and vent 98.

With the manually adjusted metering valve 71 at the desired setting, the operator steps on the accelerator pedal thereby moving the valve piston 81 downwardly, the brake valve piston 91, of course, remaining in its normal position so that only the vent port 94 is open. It should be pointed out here that the function of the metering valve 71 and the metering portion of the valve 83 is to regulate the rate at which the differential pressure in the clutch 10 is created and does not affect the total differential pressure which may be created in the clutch. The function of the metering valve 71 is to set a basic rate of change in differential pressure, which basic rate may be further varied by the metering passage 83, depending upon the position of the piston 81 in the valve 80. Thus, as the piston 81 moves downwardly in response to the operator's actuation of the accelerator pedal, the bottom of the piston 81 first begins to close off the port 86 to the vent port 87, and, though the clutch is still disengaged, during this initial movement, slack is taken up in the throttle linkage operated by the accelerator pedal and the throttle may be opened slightly to start the engine over idling speed. As the piston continues to move downwardly, the port 86 is opened to the passage 83 and the clutch 10 is engaged by the vacuum supplied from the intake manifold through line 70, line 72, port 84, passage 82, passage 83, port 86, line 74 and line 75, which is the ordinary manner in which the clutch 10 is engaged during normal operating conditions. From the foregoing, it should also be apparent that if the operator actuates the accelerator slowly in order to start the automobile slowly, the meter passage 83 will open the port 86 slowly, thereby securing a gradual engagement of the clutch. However, if the operator wishes to start the automobile quickly, he will depress the accelerator pedal quickly, thereby opening the port 86 quickly, thereby securing a quick engagement of the clutch 10.

In order to compensate for the drop in the manifold vacuum when the throttle is fully open during heavy accelerating loads or when the engine is at top speed, the vacuum storage tank 76 will insure the engagement of the clutch. The tank 76 will serve as an ample reservoir of vacuum for ten or fifteen minutes even though its capacity is moderate, and, though the vacuum in the tank 76 will decrease gradually as it is used, the gradual decrease will permit the wedge lugs 44 and 46 of the clutch to engage gradually so that if the storage tank 76 is taxed beyond its capacity, the clutch will remain engaged without slip discernible to the operator.

The vacuum storage tank 76 is brought into action when the valve piston 81 is almost fully depressed, thereby opening the port 85. When the port 85 is opened, the vacuum in the tank 76 will normally be higher than the vacuum in the manifold and both check valves 79 will be closed. Vacuum for engaging the clutch 10, therefore, will be supplied from the tank 76 to the clutch 10 through line 78, port 85, passage 82, passage 83, port 86, line 74, and line 75. When the piston 81 is returned to a position which closes the port 85, the check valves 79 will open, thereby supplying vacuum to the clutch directly from the manifold in the normal manner through the line 70 and replenishing the vacuum reservoir through the line 77.

If the car is moving and the operator's foot is off both the accelerator and brake pedals, the clutch 10 will be disengaged in the same manner as during idling. Thus, the automobile will "free-wheel." If the brake valve piston 91 is depressed slightly in response to a light touch on the brake pedal, the vent port 94 will be closed and the port 96 will be opened, thereby engaging the clutch 10 by supplying vacuum through the line 70, line 73, port 95, passage 92, port 96, and clutch supply line 75. Thus, the automobile may be taken out of "free-wheeling" by depressing the brake pedal slightly, which will not, of course, cause appreciable wear on the brake.

Because the upper end of the valve passage 92 normally extends above the port 95 a distance equal to about one-fourth of the valve piston travel, the clutch will be engaged during the first fourth of the brake piston valve travel. As the piston 91 moves farther down, however, the top of the passage 92 closes off the port 95, thereby cutting off the supply of vacuum to the clutch through the port 96 and line 75 and the top of the piston 91 opens the vent port 93, thereby disengaging the clutch by admitting atmospheric pressure through the vent 97, vent port 93, branch line 89, vent line 88, port 87, port 86, and line 74 to the clutch supply line 75. Thus, the clutch is disengaged when the brake is applied heavily and the motor cannot be stalled by the brake, unless, of course, the accelerator is actuated simultaneously. Since the operator normally operates the brake or accelerator with the same foot, the engine will stall by deliberate operation of the operator, but under no other circumstances.

Transmission clutch train

Figure 13:
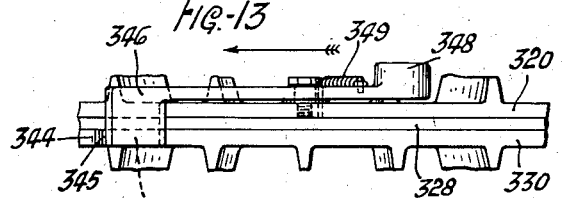
Fig. 13 is a detailed fragmentary plan view taken from the line 13—13 of Fig. 12.
Figure 12:
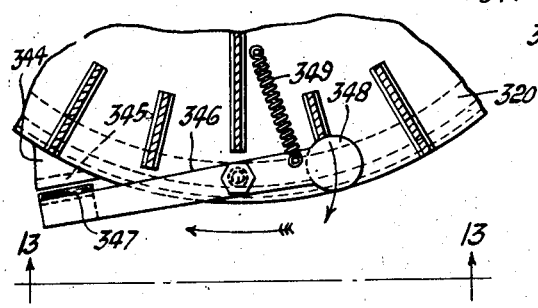
Fig. 12 is a detailed fragmentary elevation taken from the line 12—12 of Fig. 11.

The construction of a transmission according to this invention is illustrated in Figs. 11 to 13 in which a driving shaft 1, normally the crankshaft of an automobile engine, carries a fly-wheel 4 which has the usual starter ring gear 5 affixed to its rim. The end of the driving shaft 1 is provided with a socket to receive the pilot of an aligned stub driven shaft 303. Concentric with the shaft 303 is a tubular stub driven shaft 203 which is spaced from the shaft 303 by suitable bushings 207. Spaced from the shaft 203 by bushing 107 is another concentric tubular stub driven shaft 103, the shafts 103, 203, and 303 being movable a slight distance axially with respect to each other.

The train of clutches 110, 210, and 310 are carried by the stub shafts 103, 203, and 303, respectively, and are enclosed with the fly-wheel 4 within the clutch housing 6. Mounted on the end of the clutch housing 6 but suitably spaced therefrom to provide a cooling air space 8 is the gear box 9 which houses the transmission gearing 400.

Integral with the shaft 103 is the clutch plate 112 of the clutch 110. The clutch plate 112 carries a false hub 111, through which extend the auxiliary ventilating openings 158. Clutch plate 112 is also provided with sealing rings, friction rings 114, and openings 115. The false hub 111 carries the bushings 117 and 118 on which are rotatably mounted the face plates 120 and 130. The face plates 120 and 130 are each provided with sealing surfaces, friction surfaces 124 and 134, and spiral grooves 125 and 135, respectively, and the space included between the face plates 120 and 130 is sealed by the packing ring 128. The face plate 130 is provided with fins 136, but the face plate 120, however, is integral with the fins 236 of the adjacent face plate 230. Suitable openings 238 are provided between the plates 120 and 230 so that air may pass through the openings 158 and 238 to the fins 236.

The clutch plate 212 of the clutch 210 is integral with the shaft 203 and is provided with sealing rings, friction rings 214, and openings 215. On either side of the plate 214 are located the bushings 217 and 218 on the stub shaft 203. The face plates 220 and 230 are rotatably carried on the bushings 217 and 218, respectively, and are provided with sealing surfaces, friction surfaces 224 and 234, and spiral grooves 225 and 235, respectively. The space included between the face plates 220 and 230 is sealed by the packing ring 228. The face plate 220 is integral with the fins 336 adjacent face plate 330. Suitable openings 339 are provided between the plates 220 and 330 so that air may pass to the fins 336.

The clutch plate 312 of the clutch 310 is keyed to the shaft 303 by means of a suitable hub and carries a false hub 311 provided with suitable openings 359 through which air may pass to the openings 239. Clutch plate 312 is also provided with sealing rings, friction rings 314, and openings 315. The false hub 311 carries bushings 317 and 318 on which are rotatably mounted the face plates 320 and 330. The face plates 320 and 330 are each provided with sealing surfaces, friction surfaces 324 and 334, and spiral grooves 325 and 335, respectively, and the space included between the face plates 320 and 330 is sealed with the packing ring 328. The face plate 320 is provided with fins 326 for cooling and stiffening the plate.

From the foregoing, it is apparent that the construction of each of the clutches 110, 210, and 310 is substantially identical to the construction of the clutch 10 described heretofore, and the location and function of the similar elements in the several clutches are substantially the same as in the clutch 10. Relative movement between the face plates 120 and 130, 220 and 230, and 320 and 330 is restrained by the resilient load dogs 140, 240, and 340, respectively. A positive limit to the lead in the direction of rotation of the plate 120 with respect to the plate 130 is provided by the several pairs of wedging lugs 144 (not shown) and 146 which are similar in construction, location, and function to the wedging lugs 44 and 46. No positive limit is required on the clutch 210, but a limit is provided on the clutch 310 by the several wedge lugs 344 and centrifugal locking arms 346. As shown in detail in Figs. 12 and 13, wedge lug 344 is located on the rim of plate 330 and is provided with a wedge face 345. Locking arm 346 is pivoted adjacent the rim of plate 320, one end of the arm extending across the plates 320 and 330 and being provided with a wedge face 347 corresponding with the wedge face 345. On the other end of the pivoted arm 346 is located a weight 348; a spring 349 under tension normally holds the weighted end of the arm 346 in the retracted position shown in Fig. 12. When the centrifugal force on the weight 348 exceeds the tension of the spring 349, the weighted end of the arm 346 moves outwardly, causing the wedge face 347 to engage the wedge face 345, thus forcing the plates 320 and 330 together and thereby insuring the engagement of the clutch 310 at a predetermined rotary speed.

As in the clutch 10, the torque of the driving shaft 1 is transmitted through the fly-wheel 4 to the face plate 320 through the several resilient key blocks 50, preferably of rubber, which are carried in sockets 51 and are provided with radial grooves which engage ribs 326 of the plate 320. Short arcuate fins 53 and 54 prevent the key blocks 50 from being dislodged radially. Since the face plates 330 and 220 and 230 and 120 are integral through the fins 336 and 236, respectively, and since the load dogs 140, 240, and 340 connect the face plates 120 and 130, 220 and 230, and 320 and 330, respectively, the train of clutches 110, 210, and 310 normally rotate as a unit with the fly-wheel 4 through the connections afforded by the key blocks 50.

In order to ventilate the clutch housing 6 and to dissipate heat generated by the several clutches, inlets 55 are provided in the fly-wheel 4 to admit air adjacent the fins 326, and auxiliary inlets 59 are provided to admit air to the fins 336 through the openings 359 and 339. Inlets 56 are provided in the housing 6 to admit air from the air space 8 to the fins 136, and an auxiliary opening 58 is provided to admit air from the air space 8 to the fins 236 through the openings 158 and 238. As the train of clutches is driven, the fins 136, 236, 336, and 326 blow the admitted air through the outlet 57 in the outer wall of the clutch housing 6.

The train of clutches 110, 210, and 310 are engaged by evacuating air from the sealed space within the clutches, the sealed space of the clutch 310 being connected to clutch 210 by the ports 360 and the clutch 210 to the clutch 110 by the ports 260. Thus, the entire train of clutches may be evacuated through the ports 160 of the port ring 161 which is integral with the clutch plate 130, although the bore or number of ports 160, 260, and 360 preferably are progressively smaller. The port ring 161 is received in the fixed collector ring 63, and the nipple 66 is usually connected by tubing to the manifold of an internal combustion engine in the same manner described in connection with the clutch 10.

Transmission gearing

The transmission gearing 400 in the gear box 9 consists of a first speed forward, which employes the maximum speed reduction, a second speed forward, which employs an intermediate speed reduction, and a third speed forward, or direct drive, and two speeds in reverse which drive from the first and second forward speeds through the reverse idler pinion.

The transmission gearing 400 comprises a first gear 401 keyed on the end of the stub shaft 103; beyond the first gear 401 is the second gear 402 keyed to the end of the stub shaft 202, and beyond the gear 402 is the spur gear 404 keyed to the stub shaft 303. The end of the stub shaft 303 is provided with a pilot which is received in a socket of the aligned driven shaft 403, which is usually the drive shaft from the transmission to the differential of the automobile. The reverse coupler-gear 405 is splined on the shafts 303 and 403 and in its normally disengaged position, as shown in Fig. 11, acts as a sliding coupler for the shafts 303 and 403. The reverse gear 405 is slid in and out of mesh by a yoke 407 which runs in a ring groove 406 on the reverse coupler-gear 405. The means for operating the yoke 407 (not shown) may be either a directly manually operated linkage or a manually controlled power operated linkage.

The first gear 401 comprises an integral key ring 411, an annular over-running clutch 421 mounted on the ring 411, and a gear ring 431 supported on the clutch 421. The gears 402 and 403 are likewise comprised of concentric key rings 412, over-running clutch 422, and gear ring 432 and ring 414, clutch 424, and ring 434. The "hand" of the clutches 421 and 422 is so directed that the clutches engage when the gear rings tend to lag behind the key rings and disengage or "over-run" when the gear rings tend to lead the key rings. The "hand" of clutch 424 is oppositely directed so that the clutch engages when the gear ring 434 leads the key ring 414 and "over-runs" when the gear ring tends to lag behind the key ring.

The spur shaft 410 is journaled in the gear box 9 and carries the spur pinion cone 440. The spur pinion cone 440, keyed to the spur shaft 410, is comprised of the integral first pinion 441, which meshes with the first gear 401, second pinion 442, which meshes with the second gear 402, and the spur pinion 444, which meshes with the spur gear 404. Spaced from the spur pinion cone 440 and keyed to the spur shaft 410 is the reverse pinion 445 which meshes with the reverse idler pinion 455, which is supported on the stub shaft 453. When the reverse coupler-gear 405 is retracted so that the shaft 303 is uncoupled from the shaft 404, the coupler gear 405 is fully meshed with the reverse idler pinion 455.

Transmission operation

Assuming that the transmission disclosed in Figs. 11 to 13 is employed in an automobile employing a vacuum-control system similar to that disclosed in Figs. 9 and 10 and that the automobile is at a standstill, the operation of the transmission is as follows: With the engine idling, the vacuum line to the nipple 66 is open to atmospheric pressure and the train of clutches is disengaged. When the operator steps on the accelerator, however, the manifold line to the nipple 66 is closed and air commences to be evacuated from the interior of the clutch train, creating a pressure differential which causes the several mating face plates to move together and engage the clutch plates enclosed between them. Because the face plate 312 is fixed to the stub shaft 303 and the adjacent face plates of the clutches 310, 210, and 110 are integral, the clutches 210 and 110 move axially toward the clutch 310, and, even though the clearance between several face plates and clutch plates is slight, sufficient clearance between the several clutches and gears and axial movement of the tubular stub shafts should be allowed to accommodate the axial movement of the clutches during engagement.

At the instant the mating face plates of the several clutches are brought into engagement with their respective clutch plates, all of the face plates move substantially as a unit with the fly-wheel 4, and since the several clutch plates are held stationary by the starting load on the driven shaft 403, all of the clutches 110, 210, and 310 slip. Because the clutch 110 drives through the gearing having the maximum speed reduction, the starting torque which the clutch 110 must overcome is the least of the starting torques on the three clutches, and thus, as the pressure differential on the clutches increases, the clutch 110 is the first to become engaged and the automobile is driven in what is conventionally known as "first" from the driving shaft 1, fly-wheel 4, key blocks 50, face plate 320, load dog 340, face plate 330, face plate 220, load dog 240, face plate 230, clutch 110, stub shaft 103, first gear 401, first pinion 441, spur pinion 444, spur gear 404, stub shaft 303, coupler-gear 405, and driven shaft 403. Although the primary reason for the clutch 110 engaging and driving the car under normal starting conditions is that the starting torque which the clutch 110 must overcome is the least, the engagement of the clutch 110 is aided by the fact that the bore or number of the ports 160 is greater than that of the ports 260 and 360. Engagement of the clutch 110 under extreme starting load conditions is insured by the wedging lugs 144 and 146.

As the car is driven in "first," the face plates 120 and 130 and clutch plate 112 in the clutch 110 all rotate at engine speed. In the clutch 310, however, the face plates 320 and 330 rotate at engine speed but the clutch plate 312, being integral with the shaft 303, rotates at the speed of the driven shaft 403 so that the ratio of slip in the clutch 310 during "first" is equal to the ratio of the "first" gear. In the clutch 210, the face plates 220 and 230 rotate at engine speed, but the clutch plate 212, being driven from the second pinion 442 through the second gear 402 and stub shaft 203, rotates at a speed intermediate of the speed of the clutch plate 112 and the speed of the clutch plate 312, and the slip of the clutch 210 is consequently less than the slip of the clutch 310.

Because the slip of the clutch 210 is less than the slip of the clutch 310 and because the torque load becomes less as the car accelerates in "first," the clutch 210 engages as soon as the pressure differential on the clutches becomes sufficient to permit the clutch 210 to transmit the torque required. When the torque load is transmitted through clutch 210, torque from the driving shaft 1 is transmitted through the fly-wheel 4, key blocks 50, face plate 320, load dog 340, face plate 330, clutch 210, stub shaft 203, second gear 402, second pinion 442, spur pinion 444, spur gear 404, stub shaft 303, and coupler-gear 405 to the driven shaft 403. Although the clutch 110 remains engaged when the clutch 210 is engaged and the automobile is driven in "second," no power is transmitted by the clutch 110, since the second gear 402 in driving the second pinion 442 causes the first pinion 441 to over-drive the first gear 401, thereby disengaging the over-running clutch 421 of the gear 401. When the car is driven in "second," the ratio of slip in the clutch 310 is equal, of course, to the ratio of "second" to direct drive.

The time interval elapsing between the engagement of the clutch 110 and the clutch 210 depends primarily, of course, upon the load conditions. The assumption of the drive from the clutch 110 by the clutch 210 is not only accomplished as soon as the engine is able to carry the load, but the transfer of the load from the clutch 110 to the clutch 210 is accomplished very smoothly, since the clutches act smoothly and also since the clutch 210 transmits a certain amount of power prior to the complete assumption of the load. Because the over-running clutch 421 of the first gear 401 disengages at the instant the clutch 210 assumes the load, the transmission does not pass through a neutral between "first" and "second."

The clutch 310 assumes the load from the clutch 210 in the same manner that the clutch 210 assumes the load from the clutch 110, and, of course, likewise assumes the load smoothly and without passing through a neutral. When the load is carried by the clutch 310, torque from the driving shaft 1 is transmitted directly through the fly-wheel 4, key blocks 50, clutch 310, stub shaft 303, and coupler-gear 405 to the driven shaft 403. At the instant the clutch 310 assumes the load, the drag of the spur pinion 444 on the gear ring 434 of the gear 404 causes the over-running clutch 424 to disengage. Thus, no neutral is passed through between "second" and direct drive, usually termed "third" or "high."

Because the clutches 210 and 110 are still engaged when the clutch 310 is engaged, there is a tendency for the cone pinion 440 and spur shaft 410 to be driven by the second gear 402 during direct drive or "third," which is the normal operating drive. However, because no power can be transmitted from the cone pinion 440 when the clutch 424 is disengaged and because a characteristic of the over-running clutch 422 is that it is substantially disengaged when it can transmit no load, the spur shaft is not driven appreciably during "third," thereby eliminating noise and wear on the cone pinion 440, first gear 401, second gear 402, reverse pinion 445, and reverse idler 455 during normal driving conditions.

When the automobile is driven at maximum speeds or under heavy loads in direct drive, the intake manifold vacuum may fall until the differential pressure on the clutch 310 alone would be insufficient to maintain the clutch in engagement. However, because the several clutches in the train are movable axially toward each other, the differential pressures and reaction forces on each of the several face plates are additive so that the total effective pressure on any one clutch plate is equal to the differential pressure times the total area of the several face plates. Thus, the clutch 310, for example, will be maintained in engagement even when the differential pressure is very low. The engagement of the clutch 310 at high speeds and low differential pressures is insured, however, by the actuation of the centrifugal locking arm 346, although the primary purpose of the locking arm 346 is to hold the clutch 310 in engagement when the throttle is closed while the automobile is traveling at high speeds, thereby preventing "free wheeling" at speeds in excess of the speed at which the locking arm 346 engages the lug 344.

If the load demand on the engine should become excessive when the transmission is in "third," as for example, when the automobile is driven with the throttle fully opened up a steep grade, the engine speed will fall, thus disengaging the locking arm 346 and the manifold vacuum may fall so low that the differential pressure on the face plates 320 and 330 is insufficient to hold the clutch 310 in engagement. Under such circumstances, the transmission will automatically shift back to "second" or "first," depending upon the magnitude of the load, since the torque load on the clutches 210 or 110 will be reduced by driving through the spur gearing and second gear 402 or first gear 401.

To drive the driven shaft 403 in reverse, the line to the nipple 66 is opened, usually by releasing the accelerator pedal, thus disengaging the train of clutches. The operator then operates the yoke 407, causing the coupler-gear 405 to be slid into mesh with the reverse idler pinion 455 and uncoupling the shaft 303 from the shaft 403. When the clutches are then engaged, the transmission drives from the clutch 110 through the shaft 103, gear 401, cone pinion 440, spur shaft 410, reverse pinion 445, reverse idler pinion 455, reverse gear 405, and shaft 403. While the reverse gear 405 is in mesh, the torque load may shift from the clutch 110 to the clutch 210, thus driving the cone pinion 440 through the shaft 203 and gear 402, in the same manner as in the forward drive. The transmission cannot drive in reverse through the clutch 310 because the over-running clutch 424 will disengage when the key ring 414 attempts to drive the gear ring 434.

From the foregoing, it is apparent that the transmission disclosed automatically "shifts" from one stage of speed reduction to an adjacent stage of speed reduction in response to load demands and without the use of powered actuating mechanisms for changing the drive from one ratio to another. Although in the embodiment disclosed, only three speeds forward are shown, it is obvious that the number of speeds may be varied by increasing or decreasing the number of clutches and corresponding gears in the train, or that suitable over or under drives may be added, for example, by adding an additional idler pinion to mesh with the reverse idler pinion 455 and reverse coupler-gear 405.

Further, though this invention has been explained as an automobile transmission, it may be used as a transmission for other purposes. Also, although the differential pressure necessary to engage the clutches is preferably derived from the intake manifold vacuum of an internal combustion engine, it may be supplied by other means, as for example, a vacuum pump operated from the driving shaft. This invention, therefore, is not limited, either in whole or in part, to the specific embodiment disclosed but only by the appended claims.

What is claimed is:

1. In a mechanism of the class described, a driving shaft, a driven shaft, a clutch plate fixed to said driven shaft, a face plate spaced from said clutch plate and rotatable with respect to said driven shaft and operatively connected to said driving shaft, said face plate being adapted to engage said clutch plate, means sealing the space between said face plate and said clutch plate, a control system for causing said face plate and said clutch plate to be engaged or disengaged, an auxiliary driven shaft driven through said face plate, speed reduction gearing connecting said auxiliary shaft and said driven shaft, and an over-running clutch interposed between said driven shaft and said auxiliary shaft permitting said driven shaft to be driven through said clutch plate and said face plate when said plates are engaged and through said face plate and said auxiliary shaft when said plates are disengaged.

2. In a mechanism of the class described, a driving shaft, a driven shaft, a clutch plate fixed to said driven shaft, a face plate spaced from said clutch plate and rotatable with respect to said clutch plate and operatively connected to said driven shaft an inner surface of said face plate being adapted to engage said clutch plate, means sealing the space between said face plate and said clutch plate, means permitting the creation and maintenance of a fluid pressure differential between the inner and outer surfaces of said face plate, a control system for regulating the creation and maintenance of said pressure differential whereby the said clutch plate and face plate may be engaged or disengaged in direct response to said pressure differential, an auxiliary shaft operatively connected to said face plate, speed reduction gearing connecting said driven shaft and said auxiliary shaft, and an over-running clutch interposed in said gearing adapted to engage when said face plate and said clutch plate are disengaged and to disengage when said plates are engaged.

3. In a mechanism of the class described, a driving shaft, a driven shaft, a clutch plate fixed to said driven shaft, a pair of face plates normally rotatable with respect to said clutch plates and operatively connected to each other and to said driving shaft, said face plates substantially enclosing said clutch plate and the spaced inner surfaces of said face plates being adapted to engage said clutch plate frictionally, means for sealing the space included between the inner surfaces of said face plates, means for creating and maintaining a fluid pressure differential between the inner and outer surfaces of said face plates, a control system for regulating the creation and maintenance of said pressure differential whereby the said clutch plate and face plates may be engaged or disengaged in direct response to said pressure differential, an auxiliary shaft operatively connected to said face plates, speed reduction gearing connecting said driven shaft and said auxiliary shaft, and an over-running clutch interposed in said gearing adapted to engage when said face plates and said clutch plate are disengaged and to disengage when said plates are engaged.

4. In a mechanism of the class described, a driving shaft, a plurality of driven stub shafts, a plurality of clutch plates, each of said clutch plates being fixed to a stub shaft, a plurality of pairs of face plates operatively connected to said driving shaft and to each other and normally rotatable with respect to said clutch plates, each pair of face plates substantially enclosing a clutch plate and the spaced inner surfaces of said pairs of face plates being adapted to engage the enclosed clutch plates, means for sealing the space included between the inner surfaces of said pairs of face plates, means permitting the creating and maintaining of a fluid pressure differential between the inner and outer surfaces of said pairs of face plates, a control system for regulating the creation and maintenance of said pressure differential whereby the said pairs of face plates may engage or disengage the enclosed clutch plates in direct response to said pressure differential, a driven shaft, a coupler normally connecting one of said stub shafts to said driven shaft, speed reduction gearing connecting the remainder of said stub shafts to the normally coupled stub shaft, and over-running clutches interposed in said gearing adapted to disengage when the clutch plate connected to said coupled stub shaft is engaged and driven by the pair of face plates enclosing said clutch plate.

5. In a mechanism as described in claim 4, normally disengaged reverse gearing connected to said speed reduction gearing, and means to uncouple said normally coupled stub shaft and engage said reverse gearing with said driven shaft, whereby the driven shaft may be driven in reverse through the speed reduction gearing by the remainder of said stub shafts not normally coupled to said driven shaft.

6. In a mechanism of the class described, a driving shaft, a plurality of stub shafts, a train of clutches carried by said stub shafts, said train comprising a first clutch, an intermediate clutch, and a direct drive clutch, each of said clutches comprising a clutch plate and a cooperating face plate spaced from the clutch plate adapted to engage the clutch plate, means sealing the space between the clutch plate and its cooperating face plate, each of said clutch plates being fixed to one of said stub shafts and all of said face plates being operatively connected to each other and to said driving shaft, maximum speed reduction gearing connecting the stub shaft carrying the first clutch to the stub shaft carrying the direct drive clutch, a first over-running clutch interposed in said maximum speed reduction gearing, intermediate speed reduction gearing connecting a stub shaft carrying an intermediate clutch to the stub shaft carrying said direct drive clutch, an intermediate over-running clutch interposed in said intermediate speed reduction gearing, and means causing said clutches in said train to engage and drive said direct drive stub shaft progressively, said first over-running clutch being engaged when said first clutch drives and being disengaged when an intermediate clutch drives, and said intermediate over-running clutch being disengaged when said direct drive clutch is engaged.

7. In a mechanism of the class described, a plurality of shafts comprising a first shaft, an intermediate shaft, and a direct drive shaft, maximum speed reduction gearing connecting said first shaft and said direct drive shaft, a first over-running clutch interposed in said maximum speed reduction gearing, intermediate speed reduction gearing connecting an intermediate shaft and said direct drive shaft, an intermediate over-running clutch interposed in said intermediate speed reduction gearing, and means for driving progressively said first shaft, an intermediate shaft, and said direct drive shaft, said first over-running clutch being engaged when only said first shaft drives and being disengaged when an intermediate shaft drives, and said intermediate over-running clutch being engaged when said intermediate shaft drives and being disengaged when said direct drive shaft drives.

8. In a mechanism of the class described, a driving shaft, a plurality of shafts, comprising a direct drive shaft and a plurality of tubular auxiliary shafts concentric, rotatable, and axially displaceable with respect to said direct drive shaft, and each other, a train of clutches carried by said shafts, said train comprising a first clutch carried by a first auxiliary shaft, an intermediate clutch carried by an intermediate auxiliary shaft, and a direct drive clutch carried by said direct drive shaft, each clutch comprising a clutch plate fixed to the carrying shaft, and a pair of face plates substantially enclosing said clutch plate and normally spaced therefrom to provide a good running fit, means for sealing the space included between the pair of face plates, and means operatively connecting said face plates of said pairs to each other and resiliently restraining said face plates from rotation and axial displacement with respect to each other, all of said face plates in said train of clutches being operatively connected to each other and to said driving shaft, means for creating a fluid pressure differential between the inner and outer surfaces of said face plates in said clutches whereby said pairs of face plates in said clutches engage the enclosed clutch plates and the axial displacement of the several shafts with respect to each other permits the additive application of the differential pressures on the several clutches, and means for causing the progressive engagement of said first clutch, an intermediate clutch, and the direct drive clutch upon the application of a starting load.

9. In a mechanism as described in claim 8, stiffening and heat-dissipating fins located on the outer surfaces of said face plates and means permitting the access of a cooling medium to the heat-dissipating fins on an intermediate clutch through an adjacent clutch in said train of clutches.

10. In a mechanism of the class described, a driving shaft, a direct drive shaft, an auxiliary shaft concentric with said direct drive shaft, a direct drive clutch carried by said direct drive shaft, an auxiliary clutch carried by said auxiliary shaft, each of said clutches comprising a clutch plate fixed to the carrying shaft and a pair of face plates substantially enclosing said clutch plate and normally spaced therefrom by at least a good running fit, means for sealing the space included between said pair of face plates, and resilient means for restraining the rotation and axial movement of said face plates with respect to each other, means for operatively connecting all of the face plates of said clutches to each other and to said driving shaft, means for creating a fluid pressure differential between the inner and outer surfaces of said clutches whereby the pairs of normally spaced face plates engage the substantially enclosed clutch plates and cause the driving shaft to drive the auxiliary shaft and the direct drive shaft.

11. In a mechanism as described in claim 10, means connecting the sealed space included between the pair of face plates of the direct drive clutch with the sealed space included between the pair of face plates of an auxiliary clutch.

12. In a mechanism of the class described, a driving shaft, a driven shaft, a clutch plate fixed to the driven shaft, a face plate spaced from said clutch plate and operatively connected to the driving shaft, the inner surface of said face plate being adapted to frictionally engage said clutch plate and to be spaced from said clutch plate to disengage said clutch plate, means for sealing the space between said clutch plate and said face plate, and means for creating a fluid pressure differential between the inner surface of said face plate and the outer surface of said face plate, whereby the said face plate will engage the said clutch plate in response to the fluid pressure differential and cause said driving shaft to drive said driven shaft.

13. In a mechanism of the class described, a driving shaft, a driven shaft, a clutch plate fixed to said driven shaft, a pair of face plates operatively connected to said driving shaft and to each other rotatable with respect to said clutch plate and substantially enclosing said clutch plate, said face plates being normally spaced from said clutch plate, means sealing the space included between said pair of face plates, and means permitting the creation of a fluid pressure differential between the outer surfaces of said face plates and the space included therebetween whereby said face plates frictionally engage said clutch plate and cause said driving shaft to engage said driven shaft.

14. In a mechanism as described in claim 13 in which the means permitting the creation of fluid pressure differential comprise a fluid pressure conduit, a fixed collector ring connected to said conduit, a port ring carried by a face plate and received in said collector ring and having a port opening into the sealed space included between the pair of face plates whereby fluid pressure in said sealed space may vary according to the fluid pressure in said conduit.

15. A mechanism as described in claim 13, including means operatively connecting said face plates to each other comprising a resilient load dog connected to each of said face plates and restraining said face plates from rotation and axial displacement with respect to each other.

16. A mechanism as described in claim 13, including means operatively connecting said face plates to each other comprising a resilient load dog connected to each of said face plates and restraining said face plates from rotation and axial displacement with respect to each other, and wedge lugs secured to said face plates, said wedge lugs being normally spaced from each other but adapted to engage when one of said face plates tends to lead the other of said face plates in the direction of rotation when said face plates are under load, thereby limiting the lead of the one face plate and wedging the pair of face plates into engagement with the said enclosed clutch plate.

17. A mechanism as described in claim 13, including means operatively connecting said face plates to each other comprising a resilient load dog connected to each of said face plates and restraining said face plates from rotation and axial displacement with respect to each other, and centrifugal locking means comprising a lug secured to one face plate and a centrifugal locking arm pivotally mounted on the second face plate, said locking arm comprising an arm, a wedge face on one end of said arm and normally disengaged from said lug, and a weight secured to the other end of said arm, and a spring connecting said arm on said second face plate and adapted to maintain said locking arm out of engagement with said lug below a predetermined rotational speed.

18. A mechanism as claimed in claim 8 including wedge lugs secured to the face plates of said first clutch and centrifugal locking means secured to the face plates of said direct drive clutch.

19. A mechanism as described in claim 13, including means operatively connecting said pair of face plates to said driving shaft comprising a flywheel secured to said driving shaft and a resilient key engaging said fly-wheel and one of said face plates.

20. A mechanism as described in claim 4 and adapted for use in an automobile driven by an internal combustion engine in which the control system for regulating the creation and maintenance of the said pressure differential comprises an automobile accelerator pedal, an accelerator valve responsive to said accelerator pedal, a source of vacuum, a manifold line from said source to said accelerator valve, a clutch line from said accelerator valve to said means permitting the creating and maintaining of a fluid pressure differential between the inner and outer surfaces of said pairs of face plates, and a vent port in said accelerator valve, said accelerator valve connecting said manifold line to said clutch line when said accelerator pedal is actuated and opening said clutch line to said vent port when said accelerator pedal is not actuated.

21. In a mechanism as described in claim 13 in which the means permitting the creation of fluid pressure differential comprise a clutch line, a fixed collector ring connected to said clutch line, a port ring carried by a face plate and received in said collector ring and having a port opening into the sealed space included between the pair of face plates whereby fluid pressure in said sealed space may vary according to the fluid pressure in said clutch line, an automobile accelerator pedal, an accelerator valve responsive to said accelerator pedal, a source of vacuum, a manifold line from said source to said accelerator valve, and a vent port in said accelerator valve, said accelerator valve connecting said manifold line to said clutch line when said accelerator pedal is actuated and opening said clutch line to said vent port when said accelerator pedal is not actuated.

22. In a mechanism of the class described adapted for use in an automobile driven by an internal combustion engine, a normally disengaged clutch directly responsive to a fluid pressure differential, an intake manifold, an accelerator pedal, an accelerator valve responsive to said accelerator pedal, a clutch line from said accelerator valve to said clutch, a manifold line from said manifold to said valve, and a vent port in said valve normally open to atmospheric pressure, said valve having passages connecting said manifold line to said clutch line when said accelerator is actuated to engage said clutch and opening said clutch line to said vent port when said pedal is not actuated to disengage said clutch, a vacuum storage tank, an auxiliary manifold line from said manifold to said tank, a tank line from said tank to said valve, and normally open check valves in each of said manifold line and said auxiliary manifold line, said accelerator valve connecting said tank line to said manifold line and said clutch line when said accelerator pedal is substantially fully actuated and said check valves closing said manifold and auxiliary manifold lines when the vacuum in said tank is greater than the vacuum in said manifold.

23. In a mechanism of the class described adapted for use in an automobile driven by an internal combustion engine, a normally disengaged clutch directly responsive to a fluid pressure differential, an intake manifold, an accelerator pedal, an accelerator valve responsive to said accelerator pedal, a clutch line from said accelerator valve to said clutch, a manifold line from said manifold to said valve, and a vent port in said valve normally open to atmospheric pressure, said valve having passages connecting said manifold line to said clutch line when said accelerator is actuated to engage said clutch and opening said clutch line to said vent port when said pedal is not actuated to disengage said clutch, a brake pedal, a brake valve responsive to the actuation of said brake pedal, a branch manifold line connecting said manifold line to said brake valve, a branch clutch line connecting said brake valve to said clutch line, a first vent and a second vent in said brake valve open to atmospheric pressure and vent lines connecting said brake valve to said accelerator valve vent port, said brake valve, when said accelerator valve is not actuated, connecting said first vent to said accelerator valve vent port when said brake pedal is not actuated; closing said first vent and connecting said branch manifold line and said branch clutch line when said brake pedal is partially actuated; connecting said second vent to said accelerator valve vent port when said brake pedal is substantially fully actuated.

24. In a mechanism of the class described, a driving shaft, a driven shaft, a clutch plate fixed to said driven shaft, a face plate spaced from said clutch plate and operatively connected to said driving shaft, means sealing the space between said face plate and said clutch plate, fluid pressure means adapted to cause said face plate and clutch plate to engage in direct response to said fluid pressure, and means for equalizing the pressure of fluid entrained between said face plate and said clutch plate during engagement.

25. In a mechanism of the class described, a driving shaft, a driven shaft, a clutch plate fixed to said driven shaft, a face plate spaced from said clutch plate and operatively connected to said driving shaft, means sealing the space between said face plate and said clutch plate, means for causing said face plate and said clutch plate to engage whereby the driving shaft drives said driven shaft through said engaged clutch plate and face plate, and means substantially preventing the stress on said clutch plate from distorting said clutch plate.

26. In a mechanism of the class described adapted for use in an automobile driven by an internal combustion engine, a clutch directly responsive to a fluid pressure differential, an intake manifold, an accelerator pedal, means responsive to the actuation of said accelerator pedal connecting said manifold to said clutch and thereby engaging said clutch when said accelerator pedal is actuated and disconnecting said manifold and clutch and thereby disengaging said clutch when said accelerator pedal is not actuated, a brake pedal, and means responsive to the actuation of said brake pedal and, when said accelerator pedal is not actuated, connecting said manifold to said clutch and thereby engaging said clutch when said brake pedal is partially actuated and disconnecting said manifold and said clutch and thereby disengaging said clutch when said brake pedal is substantially fully operated.

27. A clutch mechanism comprising a first driving plate and a second driven plate mounted rotatably and coaxially with respect to said first driving plate, said first and second plates being axially movable relative to each other and normally spaced from each other, fluid pressure sealing means operatively engaged between said first plate and said second plate to seal the space between said first and second plates, means to create a fluid pressure differential between the pressure on the outer surface of one plate and the fluid pressure in the space enclosed between said first and second plates by said sealing means to move said plates into frictional engagement with each other whereby said first driving plate will drive said second driven plate, and means to equalize the fluid pressure in the space between said first and second plates and the fluid pressure on the outer surface of said one plate to release said first plate from a driving engagement with said second plate.

DAVID J. DOLAN.